United States Patent [19]
McMurtry

[11] Patent Number: 5,517,308
[45] Date of Patent: May 14, 1996

[54] INTERFEROMETRIC MEASURING APPARATUS EMPLOYING FIXED NON-ZERO PATH LENGTH DIFFERENCE

[75] Inventor: David R. McMurtry, Wotton-Under-Edge, United Kingdom

[73] Assignee: Renishaw plc, Gloucestershire, United Kingdom

[21] Appl. No.: 350,137

[22] Filed: Nov. 29, 1994

[30] Foreign Application Priority Data

Dec. 4, 1993 [GB] United Kingdom ............... 9324926

[51] Int. Cl.$^6$ ............................................ G01B 9/02
[52] U.S. Cl. ................................ 356/358; 356/361
[58] Field of Search .............................. 356/345, 358, 356/361

[56] References Cited

U.S. PATENT DOCUMENTS 4,813,783  3/1989  Yorge .
5,064,289  11/1991  Bockman ................ 356/358

FOREIGN PATENT DOCUMENTS 0508583  10/1992  European Pat. Off. .

Primary Examiner—Frank Gonzalez
Assistant Examiner—Robert Kim
Attorney, Agent, or Firm—Oliff & Berridge

[57] ABSTRACT

A combined interferometer and refractometer includes two interferometers each of which uses a light beam produced from a common source which are split into measuring component beams and reference component beams. The measuring component beams are directed along parallel paths to an object and are reflected back from reflecting surfaces on the object which is so positioned as to produce a fixed path length difference between the beams. The reflected beams are re-combined with the reference component beams to produce output beams which pass to a detector system which derives an output signal from each. Changes in refractive index are determined from any difference in the two output signals, and the distance moved by the object is determined from any change in either one of the output signals or by summing them and dividing by two. Methods are described whereby the measurements of refractive index or of distance can be made absolute.

8 Claims, 2 Drawing Sheets

INTERFEROMETRIC MEASURING APPARATUS EMPLOYING FIXED NON-ZERO PATH LENGTH DIFFERENCE

FIELD OF THE INVENTION

The present invention relates to interferometric measuring apparatus which combines distance measurement with measurement of refractive index.

BACKGROUND OF THE INVENTION

It is known from U.S. Pat. No. 4,813,783 to use a refractometer alongside a measuring interferometer in order to determine the refractive index of the atmosphere in the region through which the measuring beam of the interferometer passes. By this means it is possible to correct the measurements made by the interferometer for changes in refractive index which may occur during the measuring operation.

The system described in the U.S. patent referred to above, employs evacuable chambers through which each of the measuring and reference beams pass, and provides two interferometers which make measurements in parallel of the same object. Various distance measurements are made with the object at different positions and with different ones of the evacuable chambers either fully evacuated or open to the atmosphere. From the measurements the refractive index of the atmosphere is determined, and the various distance measurements are corrected for changes in the refractive index.

A known system for providing an absolute determination of the refractive index of the atmosphere is described in our European Patent Publication No. 508,583. In this publication there is described at least one auxiliary interferometer associated with a measuring interferometer, and through which a portion of the beam of the measuring interferometer is diverted. The diverted beam is split to form so-called reference and measurement arms which travel along different paths having a fixed, known path length difference before being re-combined.

An object of the present invention is to provide an alternative interferometric measuring apparatus in which a measuring interferometer is combined with a refractometer.

SUMMARY OF THE INVENTION

According to the present invention there is provided interferometric measuring apparatus comprising:

means for producing two collimated, coherent light beams, beam splitting means for producing from each of the light beams a measuring component beam and a reference component beam, the measuring component beams being directed in parallel towards reflecting surfaces on an object the movement of which is to be measured, the beam splitting means re-combining the respective measuring and reference component beams after reflection of the measuring component beams from said surfaces to produce two output combined beams;

detector means for receiving each of the two output combined beams, characterised in that a known fixed path length difference is established either between the two reference component beams or the two measuring component beams, and the detector means includes means for producing from the two output combined beams electrical signals indicative of both the relative phase difference of the two output combined beams, and the temporal phase changes of at least one of the output combined beams.

In a preferred embodiment the fixed path length difference is established between the measuring component beams at the moving object and by this means the refractive index of the atmosphere is measured effectively at the object where the path length difference is established. Thus it becomes possible to track the variations in refractive index at different positions of the object all the way along the measuring beam path. Where the atmospheric conditions are unchanging over a period it becomes possible to calibrate the beam path.

The reflecting surfaces may be plane mirrored surfaces but are preferably formed on a hollow corner cube retro-reflector, or a rooftop retro-reflector whereby the measuring component beams returning to the beam splitter after reflection from the reflecting surfaces are laterally displaced from the incoming beams to avoid interference with the laser. The retro-reflector may itself be, or may be connected to the object being measured.

The path length difference between the two measuring beam paths is created in a preferred embodiment by fixing onto the plane surface of a retro-reflector plates of material having the required thickness and a reflecting surface. The material is preferably one which has a coefficient of thermal expansion close to zero so that variations in the path length difference between the two beams due to changes in temperature of the material will be insignificant. Alternatively materials having higher coefficients of thermal expansion may be used, but it is then necessary to provide means for determining the temperature of the material for calculating the effects of temperature changes on the path length difference and for making appropriate corrections.

BRIEF DESCRIPTION OF THE DRAWINGS

The invention will now be more particularly described by way of example only with reference to the accompanying drawings in which.

DESCRIPTION OF THE PREFERRED EMBODIMENTS

Figure 1:
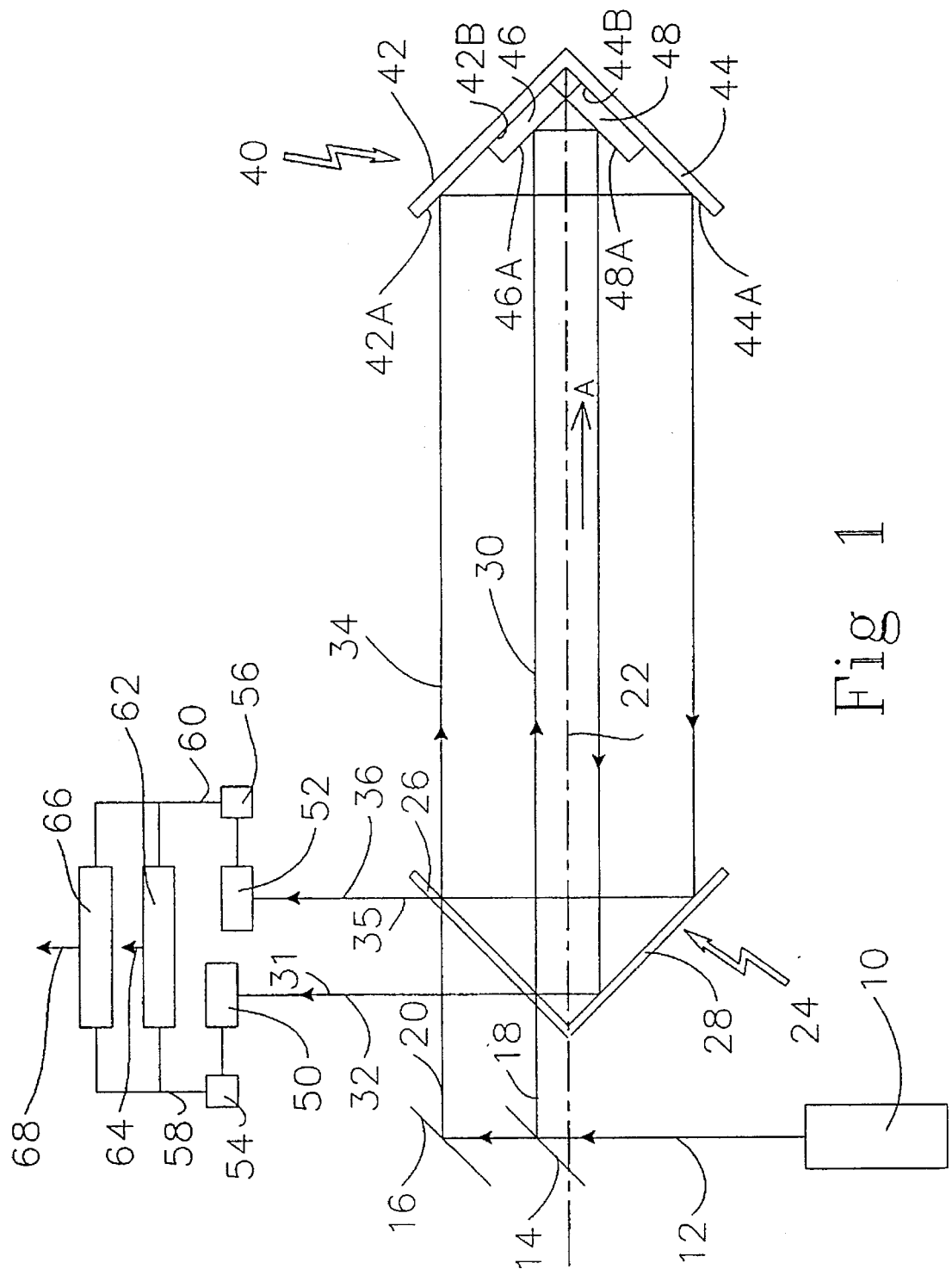
FIG. 1 is a plan view of the components of the apparatus of the present invention including a diagrammatic layout of the electronic components.

Referring now to FIG. 1, there is shown interferometric measuring apparatus which includes a light source 10 which generates a collimated light beam 12. The light beam 12 is split by a beam splitter 14 to produce a reflected secondary beam 18 and a transmitted secondary beam 20. The transmitted secondary beam 20 is turned through 90° by a mirror 16 so that the two beams 18 and 20 become parallel and are directed parallel to longitudinal axis 22 of the apparatus.

The light source 10 shown in this example is a laser, preferably a laser diode which generates a single frequency circularly polarised beam.

The two secondary beams 18 and 20 are directed towards two linear interferometers formed by common optical components.

The first component is a hollow rooftop prism 24 having top and bottom orthogonal plates 26,28 each lying at 45° to the axis 22. Plate 26 is a beam splitter and plate 28 is a mirror. Plate 26 may be polarising or non-polarising and in this example is described as a polarising beam splitter. The polarising beam splitter 26 splits circularly polarised beam 18 into a transmitted measuring component beam 30, and an orthogonal reflected reference component beam 32, and splits beam 20 into a transmitted measuring component beam 34 and an orthogonal reflected reference component beam 36. In each case the polarising beam splitter ensures that the reference and measuring component beams have orthogonal polarisation states. The two measuring component beams continue along paths parallel to the axis to impinge upon the second optical component 40 which is, or is connected to, the movable object of the linear interferometers.

The light source 10 may be of any suitable type for producing a coherent, collimated light beam, or beams. For example, the light source may be a dual frequency laser in which case the polarising beam splitter 26 is arranged to separate the frequencies, so that the one frequency forms the reference component beam and the other frequency forms the measuring component beam.

Another possibility would be to have the light source 10 produce two separate beams which could be directed parallel to the axis without the need for the beam splitter 14 and mirror 16. In this case, however, there would be the added complexity and cost of ensuring that the frequencies of the two beams were locked together.

Figure 2:
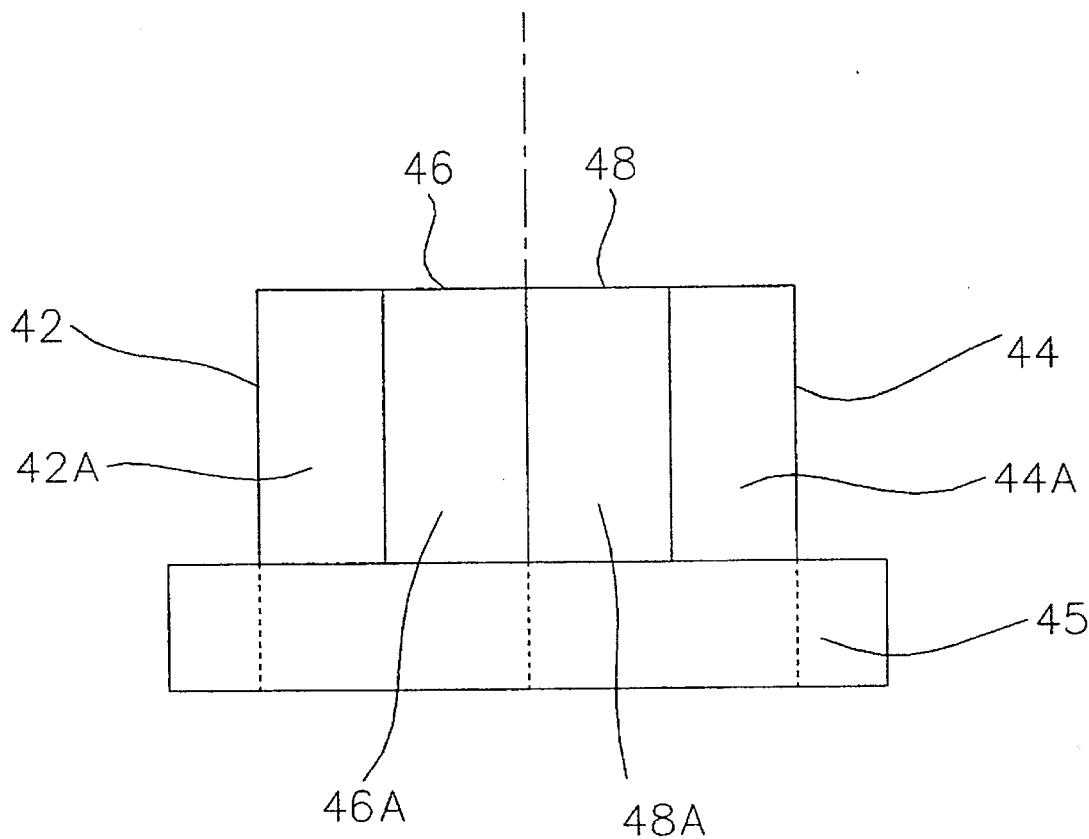
FIG. 2 is a view of the retro-reflector of FIG. 1 along the axis in the direction of arrow A.

The second optical component 40 is a retroreflector which is made up from two glass plates 42,44 which are symmetrically disposed on either side of, and at 45° to, the axis 22 and are rigidly connected to a base 45 which is preferably made from a material having the same or similar coefficient of linear expansion as the plates 42,44 (see FIG. 2).

The preferred method of connecting the glass plates 42,44 to the base is to grind and polish the lower surfaces of the plates to an optical contact surface finish, and then attach them to the base so that they stand upright from a side surface of the base. The exposed upper surfaces of each of the plates 42,44 are split into two portions, one portion of each plate being provided with a reflecting surface 42A,44A polished and coated to a mirror finish, the other portion being ground and polished to produce surfaces 42B,44B with an optical contact surface finish. Plates 46,48 of low thermal expansion material, (for example the material sold under the trade name of ZERODUR by Schott GmbH), are attached one to each of the surfaces 42B,44B, the exposed surfaces of the ZERODUR plates being polished to a mirror finish to provide reflecting surfaces 46A,48A. Use of a low thermal expansion material is preferred to avoid significant changes to the physical path length difference of the measuring component beams due to temperature variations, otherwise the temperature of the optical component 40 would have to be monitored and further corrections to the refractive index measurement calculated.

The transverse spacing of the two measuring component beams 30,34 produced by the first optical component 24 is such that the beam 30 is directed towards the reflecting surface 46A of one of the ZERODUR plates, and the beam 34 is directed towards the surface 42A of the mirror. Because the plates 42,44;46,48 are disposed at 45° to the axis, the second optical component acts as a pair of co-linear retroreflectors, and beams 30,34 are reflected back along transversely displaced paths to the mirror 28 of the first optical component. The mirror 28 reflects them through 90° to be recombined at the beam splitter with the reference beams 32 and 36 which become two combined output beams. With this arrangement the reference component beams effectively have zero length.

The above-described dual interferometer arrangement is able to track not only the movement of the second optical component, but also the refractive index of the atmosphere through which the measuring beams pass.

The first interferometer uses the measuring component beam 30 and reference component beam 32 to measure the movement of the reflecting surface of the ZERODUR reflector on the second optical component. The second interferometer uses the measuring component beam 34 and reference component beam 36 to measure the movement of the reflecting surface formed by the mirrored portion of the second optical component. The movement of the second optical component will cause a temporal phase change between the measuring component beams and the reference component beams, which will be present in the combined beams.

To obtain useable information from the combined beams they are passed to respective photodiode detector systems 50,52 which detect the intensity variations caused by interference of the beams in known manner, and which produce sinusoidal output signals. The outputs of the detector systems are passed to respective counter/interpolators 54,56 which provide outputs 58,60 with resolutions of fractions of a fringe count related to the temporal phase changes in each of the combined output beams.

Due to the thickness of the ZERODUR plates, the round trip path lengths of the two measuring component beams 32,34 of the two interferometers between the two optical components will be different by a fixed amount. This would cause no difference in the measurements made by the two interferometers of the distance moved by the second optical component if there was no change in the refractive index of the atmosphere traversed by the two beams. However, if there is a change in the refractive index of the atmosphere during the measuring operation, there will be a change in the optical path lengths of the two measuring component beams. This change will be different for each of the measuring component beams notwithstanding the fact that the physical path length difference will not have changed. This variation between the optical path lengths of the two interferometers will produce a phase difference in the combined output beams of the two interferometers which will have a direct relationship to the change in refractive index.

In order to determine the change in refractive index therefore the outputs 58,60 of the two counter/interpolators are passed to a differencing unit 62 which outputs a signal 64 related to the relative phase difference of the two combined output beams.

The measurement of the distance moved by the second optical component can be obtained by adding the two readings from the counters/interpolators together and dividing by two.

To obtain this measurement therefore the outputs of the two interferometers are also passed to a unit 66 which performs the addition and division and provides an output 68 indicative of the true distance measurement. Using the signal 64 a correction factor can be calculated for correcting the distance measurement for any change in the refractive index of the atmosphere during the measurement.

In fact since both interferometers have measured the same movement of the second optical component they will both record temporal phase changes in the respective measuring component beams, and a measurement of said movement can be obtained from only one of the counter/interpolators.

Thus the present invention provides a combined refractometer and interferometer system without the need for expensive additional equipment, for example the vacuum chambers and pumps of the prior art system.

Also it can be seen that the beams of the refractometer and the measuring beams of the interferometer use the same atmosphere for all measurements. Therefore, because the system of the preferred embodiment of the invention measures the refractive index of the atmosphere in the region of the second optical component where the path difference between the two measuring component beams is established, the refractive index of the atmosphere at any position of the reflectors along the movement path of the second component can be determined. Hence where the atmosphere is unchanging from one measurement to another, it is possible to calibrate the complete measurement path for changes in the average refractive index.

Figure 3:
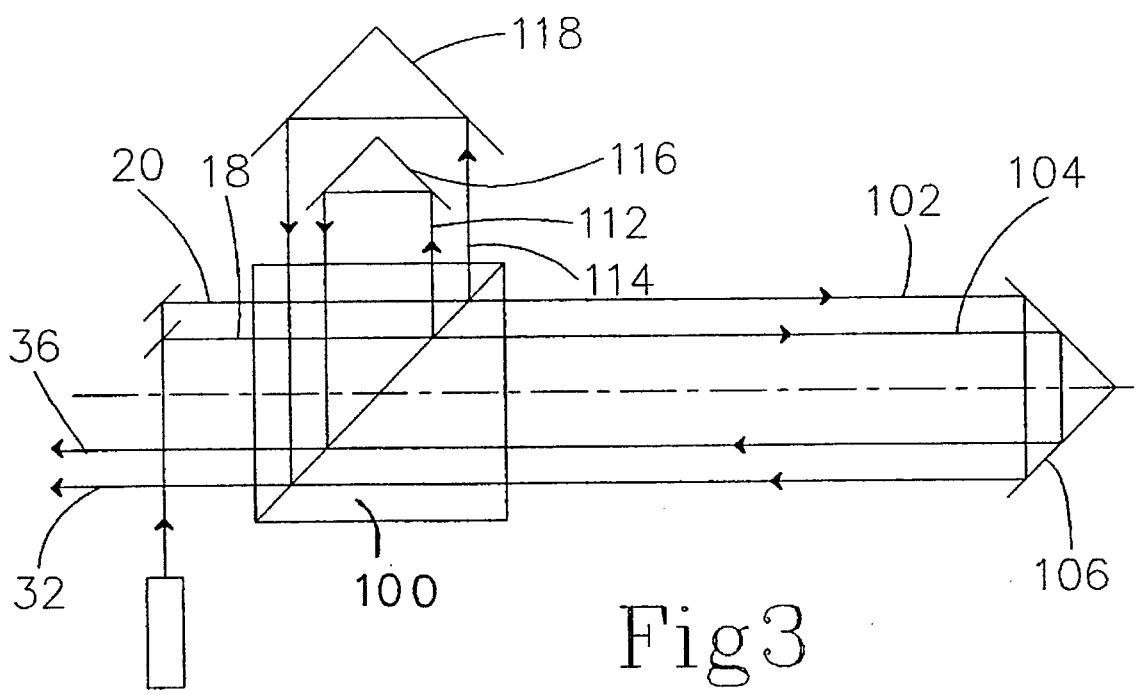
FIG. 3 is a diagrammatic layout of the optical components of an embodiment showing a fixed path length difference established between the reference arms.

FIG. 3 shows diagrammatically an embodiment of the invention in which the fixed path length difference is established between the two reference beams of the two interferometers.

A cubic beam splitter 100 is used to replace the beam splitter 26. The two beams 20,18 are directed at the beam splitter and the transmitted portions 102,104 are directed towards a conventional retroreflector 106 to be reflected back along parallel but transversely displaced paths to the beam splitter. The reflected portions 112,114 are directed towards two distinct retroreflectors 116,118, the axes of which are co-linear but the reflecting surfaces of which are axially displaced to provide the required fixed path length difference.

The beams returning from the reflecting surfaces of the retroreflectors 106,116,118 are re-combined at the beam splitter to produce the two output combined beams 32,36 which pass to the detector system and produce the required output signals as described with reference to FIG. 1.

It is possible in both of the above described embodiments, by ensuring that the physical path length difference between the two interferometers is less than a predetermined length to arrange that the refractometer determines the refractive index absolutely. For example, our European Patent Publication No. 508,583, which is hereby incorporated into this description by reference, details how, by creating a fixed physical path length difference of less than 6 mm between two interferometers, the refractive index of the atmosphere through which the beams pass can be measured absolutely provided the atmospheric conditions under which the refractometer will be used do not change by more than 100 parts per million between measurements.

Thus in one embodiment of the invention, the thickness of the ZERODUR plates is such that the fixed physical path length difference is less than 6 mm and provides an absolute range of 100 parts per million for the measurement of the refractive index.

Also by using the technology of "chirped radar", or by using a frequency tunable laser diode for one of the light sources it is also possible (as is known from U.S. Pat. No. 3,970,389) to measure the distance from the beam splitter to the object absolutely.

To achieve such a wide absolute range requires fine interpolation which can be expensive. To cut down on the interpolation requirements, thicker ZERODUR plates can be used to provide a fixed path length difference of a greater length for example 12 mm and a corresponding absolute range of 50 parts per million. Clearly the thicknesses of the two ZERODUR plates can be chosen from a whole range of thicknesses depending on the range of atmospheric conditions expected to be encountered, and on the acceptable cost of the apparatus.

If accuracy is required to be better than 1 part per million, and we have 100 parts per million range of variation of the refractive index, then when using a laser producing light at a frequency of 633 nanometers, the interpolator will need to have an accuracy of better than 3 nanometers to provide the required accuracy for a signal which is the difference of two detector signals.

A detector which can be built to have this accuracy is described in our European Patent No. 326603.

The preferred embodiment described above makes use of a hollow roof-top retroreflector, although solid glass components could be substituted. Other retroreflectors could also be substituted for example, hollow, or solid corner cube reflectors or even plane mirrors, although these introduce other problems.

For example solid glass components unless they have insignificant thermal coefficients would need to be arranged co-linearly and be very accurately aligned and mechanically locked together to minimise errors due to relative displacements, and the beam paths would have to be common mode to minimise errors due to thermal growth.

I claim:

1. Interferometric measuring apparatus for measuring movements of an object in a fluid medium, the apparatus comprising:

means for producing two collimated, coherent light beams, beam splitting means for splitting each of the two light beams into two components to provide two measuring component beams and two reference component beams, the measuring component beams being directed in parallel through the fluid medium towards reflecting surfaces on the object the movement of which is to be measured, the beam splitting means re-combining the respective measuring and reference component beams after reflection of the measuring component beams from said surfaces to produce two output combined beams, detector means for receiving each of the two output combined beams, wherein a fixed non-zero path length difference is established in the fluid medium between one of a) the two reference component beams and b) the two measuring component beams, and the detector means includes means for providing from the two output combined beams electrical signals indicative of both the relative phase difference of the two output combined beams, and the temporal phase changes of at least one of the output combined beams.

2. Interferometric measuring apparatus according to claim 1 wherein one of the measuring component beams is directed towards a reflecting surface of a first retroreflector on the moving object, the other one of the measuring component beams is directed towards a reflecting surface of a second retroreflector on the moving object, and the first and second retroreflectors are positioned relative to each other so that there is a fixed non-zero path length difference between the two measuring component beams.

3. Interferometric measuring apparatus according to claim 2 wherein the optical axes of the two retroreflectors are co-linear.

4. Interferometric measuring apparatus according to claim 3 wherein one of the retroreflectors comprises reflecting plates mounted on the other retroreflector alongside the reflecting surfaces thereof.

5. Interferometric measuring apparatus according to claim 1 wherein one of the reference component beams is directed towards a first fixed reference reflector, and the other one of the reference component beams is directed towards a second fixed reference reflector, and the two reference reflectors are positioned relative to each other so that there is a fixed known path length difference between the two reference component beams.

6. Interferometric measuring apparatus according to claim 4 wherein the plates are made from a material having a low coefficient of thermal expansion.

7. Interferometric measuring apparatus according to claim 1, wherein the two collimated, coherent light beams are produced from a common laser light source.

8. Interferometric measuring apparatus according to claim 1 wherein:

the detector means includes means for producing an output signal from each of the two output combined beams, and for providing from the output signals a first signal equal to a difference in the output signals and which is related to a change in refractive index of the surrounding atmosphere, and a second signal indicative of a change in at least one of the output signals and which is related to a distance moved by the object.

* * * * *